Sept. 11, 1962 M. KORIL ETAL 3,053,095
APPARATUS FOR MEASURING AND REGULATING VERY LOW SPEEDS
Filed July 21, 1958 4 Sheets-Sheet 1

INVENTORS
MILO KORIL
HANS-JOACHIM HERMANN
BY *Dicke and Craig*
ATTORNEYS

Sept. 11, 1962  M. KORIL ETAL  3,053,095
APPARATUS FOR MEASURING AND REGULATING VERY LOW SPEEDS
Filed July 21, 1958  4 Sheets-Sheet 2

INVENTORS
MILO KORIL
HANS-JOACHIM HERMANN

BY Dicke and Craig
ATTORNEYS

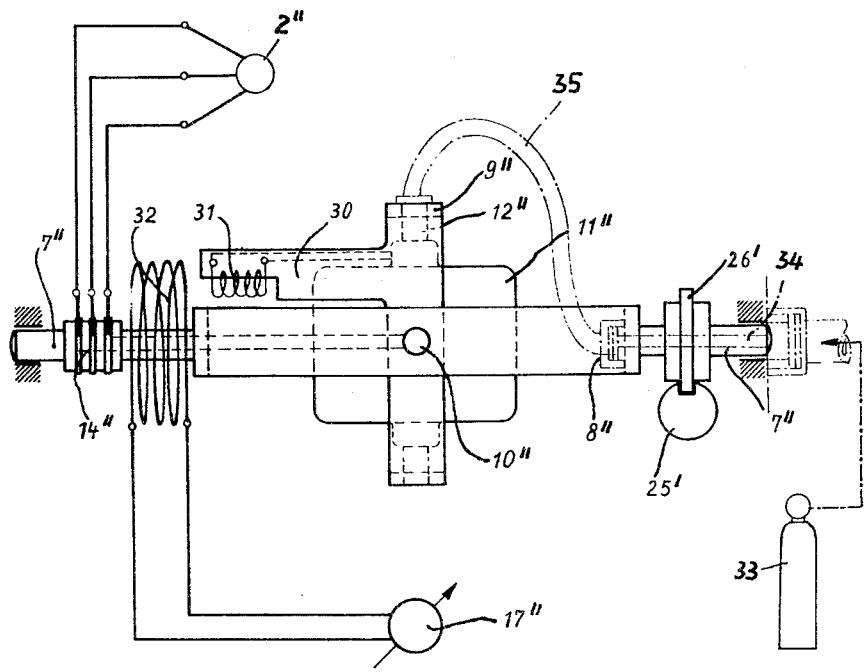

Sept. 11, 1962 M. KORIL ETAL 3,053,095
APPARATUS FOR MEASURING AND REGULATING VERY LOW SPEEDS
Filed July 21, 1958 4 Sheets-Sheet 4
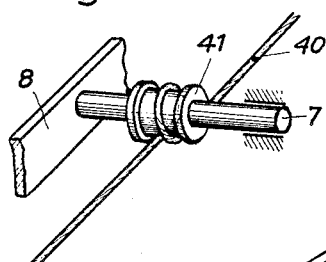
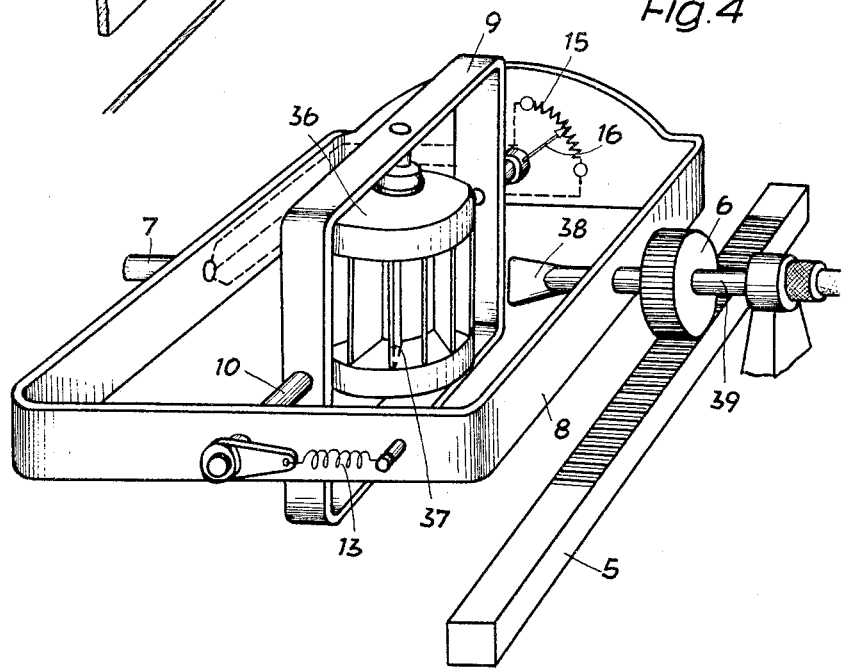
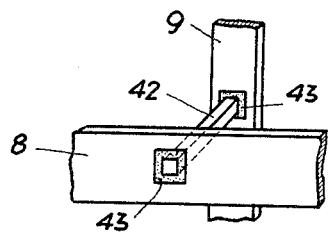
INVENTORS
MILO KORIL
HANS-JOACHIM HERMANN
BY Dicke and Craig
ATTORNEYS

United States Patent Office 3,053,095
Patented Sept. 11, 1962

3,053,095
APPARATUS FOR MEASURING AND REGULATING VERY LOW SPEEDS
Milo Koril, Stuttgart-Bad Cannstatt, and Joachim Hermann, Bernhausen, Kreis Esslingen, Germany, assignors to Bölkow-Entwicklungen Kommanditgesellschaft, Stuttgart-Flughafen, Germany
Filed July 21, 1958, Ser. No. 749,799
Claims priority, application Germany July 20, 1957
24 Claims. (Cl. 73—504)

The present invention relates to an apparatus for measuring and regulating very low speeds, and particularly the feeding speeds of machine tools.

The need for measuring extremely low speeds of about one millimeter per minute at a relatively great accuracy prevails particularly in machine tools in which the feeding operation is carried out by hydraulic or pneumatic means. Although the feeding speed of such machines is continuously adjustable, the values of such adjustments cannot be reproduced at a sufficient accuracy and the adjusting means can therefore not be accurately calibrated. In order to control the hydraulic or pneumatic feeding means so as to attain the best possible speed required for the respective work to be carried out, it is necessary to provide special feeding speed meters of which two basically different types are known.

The first type of these meters operates on a mechanical-hydraulical principle. The feeding mechanism of the machine tool drives a piston within a cylinder so as to subject a suitable medium within the cylinder to a pressure which is then able to escape through a nozzle or diaphragm to the outside. The differential pressure produced in the cylinder is then utilized as a value for determining the feeding speed, and such value may be measured by means of a pressure gauge. The degree of accuracy of the measurements attainable with such a method, which varies slightly in accordance with the particular type of pressure medium used, is, however, too low for many purposes. Furthermore, the measuring ranges which depend upon the dimensions of the respective nozzle are very limited, and they are not adjustable by a simple manipulation.

The other type of these known measuring systems operates on an electronic principle and consists of a mechanical-electrical transformer, for example, an electric resistance, inductance, or capacitance which is mechanically coupled to the feed table of the machine tool and directly effects a change in an electrical value in response to the speed of the feeding movement. This electrical value is then usually electronically amplified and subsequently indicated by a voltmeter or an ammeter. Such a measuring system requires a considerable amount of amplifying means, such as vacuum tubes or transistors, its design and construction is very complicated and easily subject to trouble, and it is also rather expensive.

It is an object of the present invention to provide an apparatus for measuring and controlling very low speeds, particularly the feeding speeds of machine tools, which, as compared with the known types of such apparatus, is of a very simple and inexpensive design and operates at a very great accuracy.

The speed controlling and measuring apparatus according to the present invention essentially consists of a gyroscope which rotates at a constant speed and is suspended at its center of gravity for universal movement within outer and inner gimbal frames. The outer gimbal frame is rotated at a speed corresponding to the speed to be measured, whereby the inner gimbal frame and thus also the axis of rotation of the gyro are given a precession deflection in accordance with such speed. This deflection is mechanically transmitted to an electrical transformer, and the electrical value thus produced may then be transmitted to and indicated by a suitable measuring instrument in which such electrical value accurately represents the speed to be measured.

The outer gimbal frame may be driven by a gear or a friction wheel on the shaft thereof which is in engagement with a gear rack or a friction rod which is connected to the machine element, the speed of which is to be measured. The movement of the respective machine element may, however, also be transmitted to the outer gimbal frame by means of an endless traction member, for example, by a chain or belt drive or by a traction member which is coiled around the driving wheel. The driving elements of the outer gimbal frame are preferably provided with a suitable coupling for connecting or disconnecting the apparatus according to the invention and for being operative in only one direction or the other. Such a coupling is preferably provided since, especially in machine tools, there is often no need to measure the quick return speeds of the respective elements. This coupling preferably consists of a free wheel clutch within the driving wheel or, in the event of the use of an endless traction member, of a mechanical or magnetic clutch.

According to another feature of the invention, the respective angular position of the gyro axis may also be utilized for controlling the speed of the respective machine element to be measured. This may be attained in the most simple manner by providing the gyroscope with suitable means which act upon the driving means of the respective machine element, for example, upon the control circuit of the motor of the feeding mechanism, so as to control the operation of such motor or other feeding means in accordance with the precession of the gyroscope.

Since the size of the deflection and the sensitivity of the gyroscope depend not only upon the angular velocity produced by the speed of the machine element to be measured, but also upon the rate of speed of the gyro itself and the strength of the resilient restoring moment thereof, it is easily possible to adjust the sensitivity of the gyroscope in accordance with the speed range to be measured and controlled by varying these factors.

Thus, the precession deflection of the gyroscope may be easily adjusted to a different speed range to be measured by rotating the gyro itself at a different constant speed.

For this purpose, the gyro may be made in the form of an alternating or a three-phase current motor, which may be either a synchronous or an asynchronous motor or a motor with a compound winding, the speed of which is controlled primarily by the frequency rather than by the voltage of the current supplied thereto. If the gyro motor is provided with a changeable polarity, it is possible to attain several different measuring ranges by a simple switching operation resulting in different constant speeds of the gyro motor.

In the event that the gyro motor is driven by a direct current, it may be provided with a centrifugal governor which may also be adjusted to produce different rates of constant speeds.

The gyro motor according to the invention is provided with an outside rotor and may, according to another feature of the invention, also contain the rotary elements of an electric generator for producing a measuring voltage, preferably of a high frequency. The inner gimbal frame is then preferably designed so as to form the housing of the generator or to be integrally connected thereto. In this event, it will not be necessary to supply the measuring voltage from a separate source at the outside of the gyroscope. Consequently the slip rings for supplying the measuring voltage from such outside source to the gyroscope may be omitted.

The electrical transformer for producing the voltage to be measured in accordance with the deflection of the gyro motor may consist either of a potentiometer or of an induction system with a variable inductive coupling, or of a capacitative system with a variable capacitance. The application of either of these systems has the advantage that no galvanic contacts will then be required for transmitting the measuring values to the indicating instrument.

The resilient restoring moment which counterbalances the precession moment may be produced by springs which preferably interconnect the two gimbal frames. The measuring accuracy and the extent of the speed scale of the indicating instrument may also be influenced by the characteristics of these springs. Thus, by exchanging these springs or by varying their tension, it is also possible to vary the measuring range of the apparatus.

The resilient interconnection of the two gimbal frames may also consist of torsion springs which may further form the pivotable shaft of the inner gimbal frame and, if desired, may also be used as conductors for supplying the electric current to the gyro motor.

Further objects, features, and advantages of the present invention will become apparent from the following detailed description thereof, particularly when read with reference to the accompanying drawings, in which—

FIGURE 3 shows a side view of a measuring apparatus according to a further modification of the invention;

FIGURE 4 shows a perspective view of a further modification of the measuring apparatus according to the invention with a pneumatically driven gyro;

FIGURE 5 shows a perspective view of an outer gimbal frame drive by means of a traction cord or cable; while FIGURE 6 shows a perspective view of a resilient connection between the outer and inner gimbal frames consisting of torsion rods which also serve as the pivotable shafts of the inner gimbal frame and, if desired, also as electrical conductors for transmitting the electric current to the gyro motor for driving the same.

Figure 1:
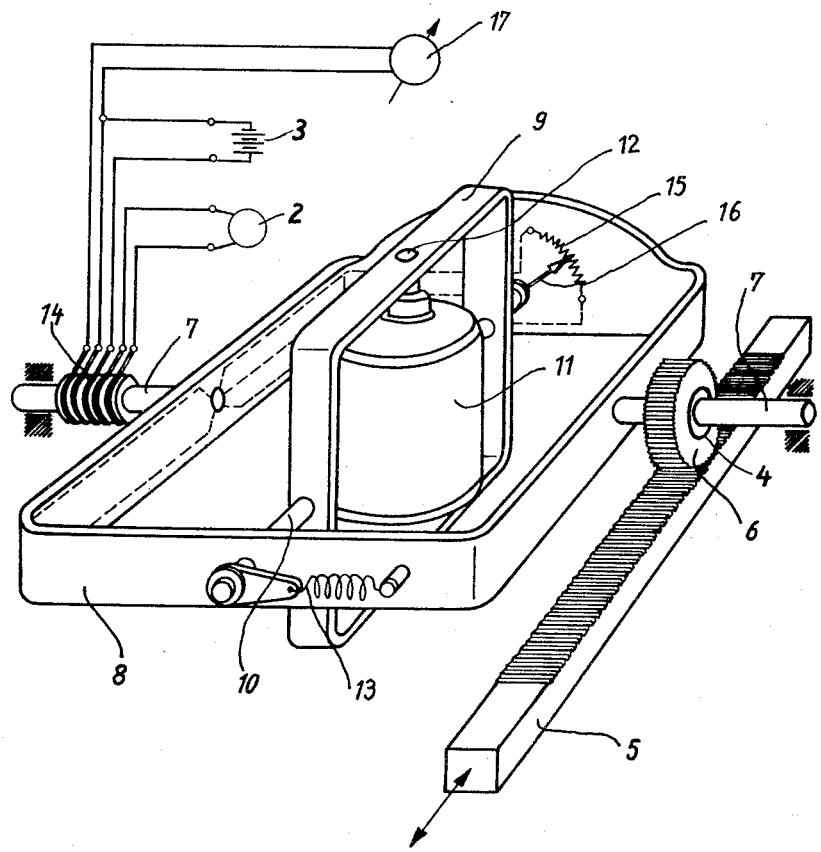
FIGURE 1 shows a perspective view of the speed measuring and controlling apparatus according to the invention as seen in the neutral position.

Referring to the drawings, and first particularly to FIGURE 1, the measuring apparatus according to the invention essentially consists of a gyroscope which comprises an outer gimbal frame 8 which is secured to a drive shaft 7 consisting of a pair of opposite coaxial shaft stubs which are rotatably mounted in bearings which are fixed relative to a respective machine tool, and one of which carries a gear 6 in meshing engagement with a gear rack 5. This gear rack is positively connected to a movable element of the respective machine tool, the speed of which relative to the machine frame is to be measured. Since in many cases the return movement of the respective machine element does not have to be measured and such return movement is often carried out by a quick traverse, a suitable clutch may be provided between shaft 7 and gear 6, for example, in the form of a free-wheel clutch 4, as diagrammatically indicated in FIGURE 1. An inner gimbal frame 9 is mounted within the outer frame 8 on a shaft 10 which likewise consists of a pair of opposite coaxial shaft stubs and allows frame 9 to pivot about an axis which extends vertically to the axis of drive shaft 7. The inner frame 9 contains the actual gyro 11 which is rotatable on a shaft 12 which, in turn, extends vertically to shaft 10. The two gimbal frames 8 and 9 are resiliently interconnected by a spring 13 which maintains the inner frame 9 and thus the axis of rotation of gyro 11 in the position relative to the outer frame 8 as illustrated in FIGURE 1 when the latter is not being rotated and which also tends to return frame 9 to such position when the rotation of the outer frame 8 ceases. In this position, the axis of rotation 12 therefore also extends vertically to drive shaft 7.

Gyro 11 consists of a suitable motor with an external rotor which is driven at a constant rate of speed. The left section of drive shaft 7 carries five slip rings 14 which by means of suitable slide contacts, transmit to the apparatus the current for driving the motor 11 which is supplied by a suitable source of current 2, as well as a measuring voltage which is supplied by a source 3 of direct current and also permits the connection of a measuring instrument 17 thereto.

A potentiometer 15 which is mounted between the two gimbal frames 8 and 9 has a slide contact 16 which is rigidly connected to shaft 10 and is illustrated in FIGURE 1 as being in its central position. Potentiometer 15, 16 converts the respective precession deflection of the inner gimbal frame 9 into an electrical measuring value which is then indicated by the voltmeter 17.

Since gear rack 5 is positively connected to the part of the machine tool, the movement of which is to be measured, and since this rack 5 is in meshing engagement with gear 6 on shaft 7, a movement of rack 5 will result in a rotation of the outer gimbal frame 8 about the axis of shaft 7. Shaft 12 forming the axis of rotation of gyro 11 which rotates at a constant rate of speed is thus subjected to a precession deflection about the axis of shaft 10, the angle of which depends among other factors upon the restoring force which is produced by spring 13. Whatever the speed of movement of rack 5 might be, the same will always result in a proportional precession deflection of frame 9 which will then be converted by potentiometer 15, 16 into a corresponding electrical value which will be indicated by the instrument 17.

If the rotation of gear 6 in either direction of movement is transmitted to drive shaft 7, that is, if gear 6 is positively connected at all times to drive shaft 7 and not by means of a freewheel clutch, the measuring apparatus will indicate the exact speeds of both the forward and return movements of rack 5.

Figure 2:
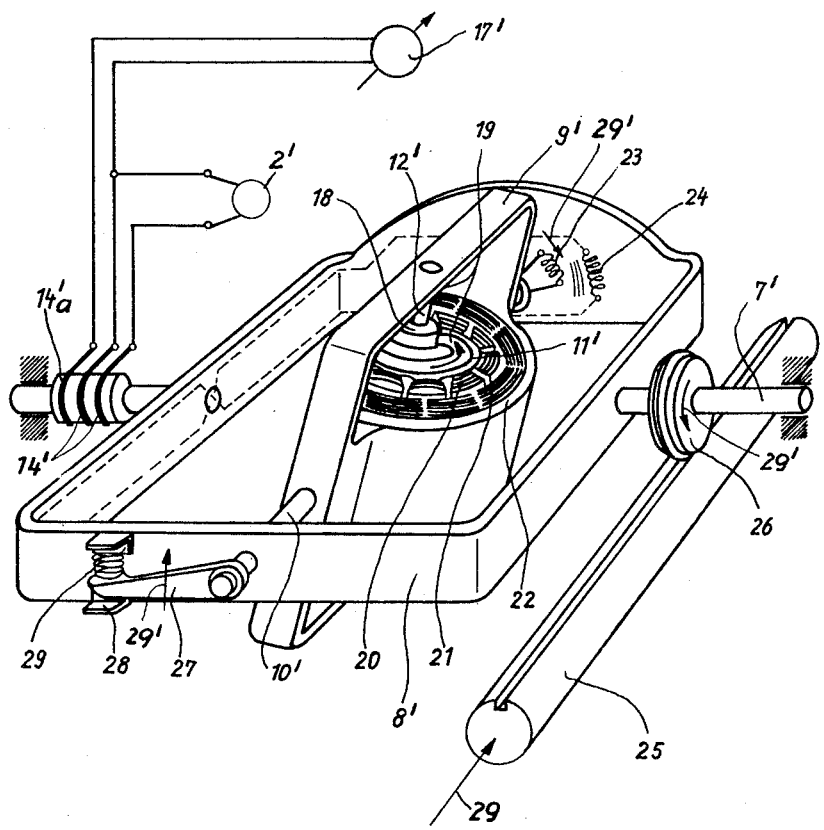
FIGURE 2 shows a similar perspective view of a measuring apparatus according to a modification of the invention and in a position while the measuring operation is being carried out.

The apparatus according to the modification of the invention as illustrated in FIGURE 2 differs from that previously described primarily by the fact that the measuring voltage is not supplied to the gyroscope from the outside but is produced by a generator which is mounted within the gyro 11' itself. Consequently, the number of slip rings 14 required on shaft 7' will be accordingly smaller.

In this embodiment of the invention, the gyro shaft 12' which is rotatably mounted in gimbal frame 9' carries a motor armature 18 on which an outer rotor 19 of an alternating current motor is mounted so as to be rotatable at a constant rate of speed. The current for driving the motor is supplied from a suitable source 2 through slip rings 14' on shaft 7'. Rotor 19 also carries the revolving field 20 of a generator. The induction coils 21 of the generator are provided within the generator housing 22 which is rigidly connected to gimbal frame 9' or forms an integral part thereof. The high-frequency current produced by the generator flows through a coil 23 which is mounted on frame 9', and induces a voltage in the opposite coil 24 which is mounted on frame 8'. The strength of this voltage depends upon the position of the two gimbal frames 8' and 9' relative to each other. Consequently, the value of this relative position of the two gimbal frames will be converted by the voltage in coil 24 into an electrical value which may then be easily measured when conducted through one of the slip rings 14' for the motor current and a separate slip ring 14'a to the measuring instrument 17'.

The longitudinal movement of the respective part of the machine tool to be measured is transmitted in the embodiment of the invention according to FIGURE 2 by means of a shaft 25 which is in a frictional engagement with a friction wheel 26 on drive shaft 7'. If gimbal frame 9' is in its normal position, a lever 27, which is secured to the inner gimbal frame 9' by being rigidly mounted on one section of shaft 10' thereof which forms the precession axis, is pressed by a compression spring 29 into engagement with a stop member 28 on frame 8'. The deflection of gyro 11' caused by the precession thereof can occur in this embodiment of the invention only in one direction of the movement from the normal position, as indicated by the arrows 29'.

In the further modification of the invention, as illustrated in FIGURE 3, the measuring current which is produced by a gyro motor-generator in a manner similarly as described with reference to FIGURE 2 is passed through a coil 31 which is mounted on a support 30 projecting from gimbal frame 9" toward the outside. This design permits the second coil 32, in which a measuring voltage will be induced by the high-frequency current flowing through coil 31, to be mounted on the housing (not shown) of the apparatus and concentrically to the axis of drive shaft 7" rather than within the gyroscopic system itself. Consequently, in this embodiment no slip rings will be required for transmitting the measuring voltage to the measuring instrument 17". The gyro motor 11" of this embodiment may consist of an induction motor, the operating current of which is supplied through slip rings 14" on shaft 7" from a source of three-phase current 2", and which is likewise driven at a constant rate of speed.

If rod 25' is moved by the respective part of the machine, the movement of which is to be measured, and such movement is transmitted by friction to wheel 26', gimbal frame 8" will be rotated accordingly, and coil 31 will be pivoted about the axis of coil 32. The positions of coils 31 and 32 relative to each other are dependent upon the deflection of the gyro axis 12" caused by the precession thereof, and the voltage induced in coil 32 will thus form a value for determining the speed of movement of rod 25'.

The gyro used in the apparatus according to the invention may also be driven pneumatically which would be particularly of advantage if the respective machine tool is provided with a pneumatically driven feeding mechanism or with pneumatically operated clamping means. Gyro 11" would then be in the form of a turbine which may be supplied with a current of air of a constant volume and pressure from a suitable source 33, as indicated diagrammatically in FIGURE 3. For passing such constant air pressure into gyro 11", shaft 7" may, for example, be hollow and thus form a conduit, or a separate conduit 34 may extend therethrough, one end of which is connected to the source of pressure, while the other end may, for example, be connected to a flexible conduit 35 which, in turn, is connected to gyro 11", all as indicated in FIGURE 3 in dot-and-dash lines.

FIGURE 4 illustrates a different type of a pneumatically driven gyro which is suspended in the same manner as shown in FIGURE 1 and consists of an impeller 36 with blades 37 upon which a constant current of air is blown from a nozzle 38 which is rigidly connected to and rotates with the hollow section 39 of shaft 7 which carries the driving gear 6. The change in air pressure upon the impeller blades 37 caused by the deflection of gyro 36 and the resulting change in angularity relative to nozzle 38 may be compensated by spring 13 or by dimensioning potentiometer 15 accordingly.

FIGURE 5 illustrates another type of drive in which the movement of the machine element to be measured is transmitted to the outer gimbal frame 8 by means of a cord or cable 40 which is coiled around a pulley 41 on drive shaft 7. Such cord or cable 40 may be used to measure the speed of a machine element moving either in a rectilinear direction or in a rotary direction. One end of such cable 40 may, for example, be connected to the respective machine element, while its other end may run over a reversing pulley, not shown, and back to a stationary part of the machine. Of course, for measuring the speed of a rotary element, cable 40 may form an endless belt which connects such element or a pulley thereon with pulley 41.

FIGURE 6 finally illustrates that in place of providing a solid shaft 10 and a separate spring 13 or 29, as shown in FIGURES 1 and 2, for pivotably mounting the inner gimbal frame 9 on the outer gimbal frame 8 and for resiliently connecting these frames to each other, these two features may be combined by making the shaft in the form of a torsion bar 42 which is rigidly secured at each end to one of frames 8 and 9. If these ends are mounted in a suitable insulation 43, one or both coaxial torsion bars 42 forming shaft 10 may be used as current conductors. The driving current may then be supplied from slip rings 14, as shown in FIGURES 1 and 2, through suitable conductors running along the outer frame 8 to one or both torsion bars 42 and thence by suitable lead-wires into the housing of gyro 11.

Although our invention has been illustrated and described with reference to the preferred embodiment thereof, we wish to have it understood that it is in no way limited to the details of such embodiment, but is capable of numerous modifications within the scope of the appended claims.

Having thus fully disclosed our invention, what we claim is:

1. An apparatus for measuring and regulating very low speeds, comprising an outer gimbal frame having a shaft secured thereto, means for rotatably mounting said shaft in a fixed position, an inner gimbal frame pivotably mounted within said outer frame about an axis extending at right angles to the axis of said shaft of said outer frame, a gyroscope suspended at the center of gravity thereof and rotatably mounted within said inner frame about a gyro axis extending at right angles to the axis of said inner frame, means for resiliently interconnecting said frames, means for rotating said gyroscope at a constant speed, means for connecting said outer frame to an element the speed of which is to be measured so as to rotate said outer frame at a speed proportional to the speed of said element, whereby said gyroscope will be subjected to a precession deflection in accordance with the speed of rotation of said outer frame, and means for indicating said deflection to determine the speed of said element.

2. An apparatus as defined in claim 1, further comprising electrical means for transforming the deflection of said gyro axis into a corresponding electrical value, said indicating means comprising an electrical measuring instrument for measuring and indicating said electrical value.

3. An apparatus as defined in claim 1, wherein said gyroscope includes said means for rotating the gyroscope at a constant speed and comprises an electric motor.

4. An apparatus as defined in claim 3, wherein said motor is an alternating-current motor, the speed of which is controlled by the frequency of the current supplied thereto.

5. An apparatus as defined in claim 3, wherein said motor is a direct-current motor having a centrifugal governor for regulating its speed.

6. An apparatus as defined in claim 3, wherein said motor has an external rotor.

7. An apparatus as defined in claim 3, wherein said motor is a three-phase current motor having changeable pole connections for attaining at least two different rates of constant speed.

8. An apparatus as defined in claim 1, further comprising an electric generator, the rotary elements of said generator being disposed within and rotatable with said gyroscope for producing a measuring voltage, said generator having a housing rigidly connected to said inner frame, and means for transforming said voltage to a voltage value in accordance with said deflection of said gyro axis, said indicating means comprising an electrical measuring instrument for measuring and indicating said voltage value.

9. An apparatus as defined in claim 1, wherein said resilient means comprise at least one torsion spring interconnecting said two frames.

10. An apparatus as defined in claim 9, wherein said torsion spring forms at least a part of the pivotal shaft of said inner frame and being rigidly secured at opposite ends to said outer and inner frames.

11. An apparatus as defined in claim 10, wherein said gyroscope includes said means for rotating the gyroscope at a constant speed and comprises an electric motor, said torsion spring also forming a part of a current conductor for leading an electric current for driving said motor to said gyroscope.

12. An apparatus as defined in claim 1, wherein said gyroscope comprises means for driving it pneumatically, and means for supplying a constant pneumatic pressure to said gyroscope.

13. An apparatus as defined in claim 2, wherein said transforming means comprise a variably coupled induction system so that no galvanic contacts will be required for transmitting the electrical measuring value to said measuring instrument.

14. An apparatus as defined in claim 2, wherein said transforming means comprise a capacitative system with a variable capacity so that no galvanic contacts will be required for transmitting the electrical measuring value to said measuring instrument.

15. An apparatus as defined in claim 1, further comprising coupling means interposed between said shaft and said means for connecting said outer frame to an element the speed of which is to be measured, said coupling means being adapted for connecting said shaft to said connecting means and for disconnecting them from each other.

16. An apparatus as defined in claim 15, wherein said coupling means comprise a freewheel clutch for permitting said outer frame to be rotated in only one direction by said connecting means.

17. An apparatus as defined in claim 1, wherein said means for connecting said outer frame to an element the speed of which is to be measured comprise a gear rack connected to said element, and a gear mounted on said shaft of said outer frame and in meshing engagement with said rack.

18. An apparatus as defined in claim 1, wherein said means for connecting said outer frame to an element the speed of which is to be measured comprise a rod connected to said element, a wheel on said shaft of said outer frame, and friction means on at least one of said rod and said wheel for frictional engagement of said wheel with said rod.

19. An apparatus as defined in claim 1, wherein said means for connecting said outer frame to an element the speed of which is to be measured comprise a wheel on said shaft of said outer frame, and a flexible traction member connecting said element with said wheel for transmitting its movement thereto.

20. An apparatus for measuring and regulating very low speed rectilinear movement of two members relative to each other in a predetermined direction, comprising an outer gimbal frame, means for rotatably supporting said outer gimbal frame in a fixed position relative to one of said members, an inner gimbal frame pivotally mounted within said outer frame about an axis extending at right angles to the axis of rotation of said outer frame with respect to said one member, a gyroscope suspended at the center of gravity thereof and rotatably mounted within said inner frame about a gyro axis extending at right angles to the pivotal axis of said inner frame, means for resiliently interconnecting said frames, means for rotating said gyroscope, means for connecting said outer gimbal frame to the other member to effect rotation of said outer frame relative to said one member in response to relative rectilinear movement of said two members in said predetermined direction, whereby said gyroscope will be subjected to a precession deflection in accordance with the speed of rotation of said outer frame, and means for indicating said deflection corresponding to the speed of movement of said members relative to each other.

21. An apparatus according to claim 20, wherein said means for rotating said gyroscope includes a pneumatic nozzle for directing a current of air against said gyroscope, said nozzle being in generally fixed position relative to said outer gimbal frame, said means for indicating the gyroscope deflection including means for compensating for changes in driving force of said air current on said gyroscope occurring in response to rotation of the gyro axis during precession of the gyroscope, whereby said means for indicating precession deflection will provide an indication unaffected by changing speed of said gyroscope occasioned by said changes in air pressure.

22. An apparatus according to claim 20, wherein said means for rotating said gyroscope includes a pneumatic nozzle for directing a current of air against said gyroscope, said nozzle being in generally fixed position relative to said outer gimbal frame, said means for resiliently interconnecting said frames including a spring having a predetermined spring characteristic to compensate for changes in air pressure upon said gyroscope occurring when the position of said nozzle relative thereto is changed during precession, whereby said means for indicating said precession deflection will provide an indication unaffected by changing speed of said gyroscope occasioned by said changes in air pressure.

23. In a manufacturing machine having a stationary part and a member having translational movement with respect to said stationary part, an apparatus for measuring very low speed translational movement of said member relative to said stationary part, comprising an outer gimbal frame, means for rotatably supporting said outer gimbal frame with its axis in a fixed position relative to said stationary part, an inner gimbal frame pivotally mounted within said outer frame about an axis extending at right angles to the axis of rotation of said outer frame, a gyroscope suspended at the center of gravity thereof and rotatably mounted within said inner frame about a gyro axis extending at right angles to the pivotal axis of said inner frame, means resiliently interconnecting said frames tending to restore them to a predetermined position relative to each other, means for rotating said gyroscope, coupling means for interconnecting said outer gimbal frame with said movable member to effect rotation of said outer frame about its axis in response to translational movement of said movable member relative to said stationary machine part, said coupling means being connected to rotate said outer frame in the direction which will subject said gyroscope to a precession deflection in opposition to the restoring force of said resilient interconnecting means in accordance with the translational speed of said movable member, and means for measuring the precession deflection of said gyroscope to provide an indication of said translational speed.

24. Machine apparatus according to claim 23 wherein said coupling means includes a rotatable element directly coupled to said outer gimbal frame and an elongated member in driving engagement with said rotatable element, said elongated member being operatively connected to said movable member and movable longitudinally thereby in accordance with said translational movement to rotatably drive said outer gimbal frame.

References Cited in the file of this patent

UNITED STATES PATENTS

| | | |
|---|---|---|
| 1,801,619 | Arrea | Apr. 21, 1931 |
| 2,620,669 | Braddon | Dec. 9, 1952 |
| 2,856,772 | Strihafka | Oct. 21, 1958 |
| 2,913,662 | Hogan | Nov. 17, 1959 |

FOREIGN PATENTS

| | | |
|---|---|---|
| 555,215 | Canada | Apr. 1, 1958 |